United States Patent [19]

Groen

[11] 3,803,496

[45] Apr. 9, 1974

[54] RECEIVING APPARATUS

[76] Inventor: Peter Groen, Emmasingel, Eindhoven, Netherlands

[22] Filed: June 16, 1972

[21] Appl. No.: 263,422

[30] Foreign Application Priority Data

June 24, 1971 Netherlands ........................ 7108692

[52] U.S. Cl. .......... 325/475, 178/DIG. 12, 325/404, 325/477, 325/319, 325/482

[51] Int. Cl. ............................................ H04b 1/12

[58] Field of Search ........... 325/323, 324, 425, 473, 325/474–477, 480, 482, 404, 65, 319; 178/DIG. 12

[56] References Cited

UNITED STATES PATENTS

| | | | |
|---|---|---|---|
| 3,374,435 | 3/1968 | Engel | 325/324 |
| 2,999,925 | 9/1961 | Thomas | 325/474 |

*Primary Examiner*—Albert J. Mayer

*Attorney, Agent, or Firm*—Frank R. Trifari; Henry I. Steckler

[57] ABSTRACT

Receiving apparatus which comprises a tuning device, a detector and a low frequency amplifier. The low-frequency amplifier includes a noise reduction circuit which attenuates signals which have a frequency higher than a given cut-off frequency and an amplitude smaller than a given threshold value. This threshold value is adjustable by means of a control device. From the tuning device there is applied to this control device a control signal which is obtained by rectifying the modulated carrier signal received by the tuning device and by which the threshold value of the noise reduction circuit is controlled in accordance with the amplitude of the modulated carrier signal.

11 Claims, 7 Drawing Figures

RECEIVING APPARATUS

Figure 1:
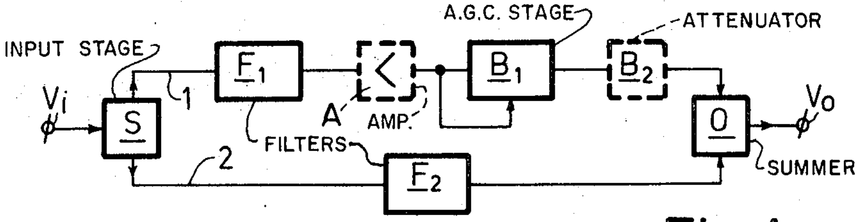

The invention relates to an apparatus for receiving a carrier signal modulated by a modulating signal, which apparatus comprises a tuning device which includes at least an amplifier and a detector for the carrier signal, and a low-frequency amplifier for amplifying the detected modulating signal.

A problem in such receiving apparatus is the noise present in the modulating signal which is to be reproduced and has been obtained from the modulated carrier signal by means of the receiving apparatus. Unlike, for example, the noise which occurs in tape recorders, the said noise does not have a comparatively constant level, but its level varies greatly, for in the receiving device the received modulated carrier signal is processed so as to produce an output signal at a substantially constant level. Obviously, the amplification required for this purpose varies greatly in accordance with the amplitude of the received modulated carrier signal. This means, however, that the noise already present in this signal and the noise introduced by the input stages of the receiving apparatus also are subjected to variable amplification, which results in that the noise level in the modulating signal to be reproduced may vary greatly.

It is an object of the invention to provide a receiving apparatus which is provided with means by which the noise in the modulating signal to be reproduced is effectively reduced.

For this purpose the invention is characterized in that the low-frequency amplifier includes a noise reduction circuit which attenuates signals which have a frequency higher than a given cut-off frequency and an amplitude smaller than a given threshold value and is provided with an input stage which has a first and a second output and to which the signal to be processed is applied, a summing stage which has a first and a second input and from the output of which the processed signal may be derived, a first signal path which forms the connection between the first output of the input stage and the first input of the summing stage, a second signal path which forms the connection between the second output of the input stage and the second input of the summing stage, a high-pass filter included in the first signal path, an automatic gain control which is included in the first signal path and the input of which is connected to the output of the high-pass filter and the gain of which changes when the signal offered to its input exceeds the said threshold value, and a control device for setting this threshold value, to which control device a control signal is applied which is obtained by rectifying the modulated carrier signal.

Thus the noise reduction circuit used has both a frequency-dependent nature and an amplitude-dependent nature. The choice of the amplitude-dependent nature is determined by the fact that the human ear is not capable of perceiving the noise when signals having the same frequency but a larger amplitude are also present, which effect is generally referred to as masking. Leaving the offered signal alone in this case ensures that the desired signal is transmitted undistorted, whilst the noise it contains is not troublesome. Signals having an amplitude smaller than, or corresponding to, the noise level are greatly attenuated together with this noise by means of the noise reduction circuit. It is true that the information contained in these signals is lost, however, this would be drowned by this noise in any case. Thus the noise reduction is effected in accordance with the amplitude of the signal offered.

The noise reduction circuit further has a frequency-dependent nature, i.e., the noise reduction circuit responds only to the amplitude of signals at higher frequencies, that is frequencies in the upper frequency band of the modulating signal to be reproduced. This is desirable because, if the noise reduction circuit should respond also to signals at lower frequency, that is frequencies below the said frequency band, a noise modulation effect may be produced which may even be far more troublesome than is continuous noise.

From the above it will be evident that the threshold value of the noise reduction circuit will be chosen to be at least equal to the level of the noise present in the modulating signal. As has been stated, however, the noise level of the modulating signal to be reproduced may vary greatly, so that to ensure effective reduction of this noise it is not sufficient to use a fixed threshold value for the noise reduction circuit, but this threshold value is continuously to be adapted to the noise level of the signal offered. Now it has been found that the amplitude of the received modulated carrier signal is a reasonably satisfactory measure of the noise level of the modulating signal to be reproduced, in a sense such that with decreasing amplitude of the modulated carrier signal the noise level in the modulating signal increases, which may be explained by the increasing gain in the receiving device. In the receiving apparatus according to the invention this relationship between the amplitude of the modulated carrier signal and the noise level in the modulating signal to be reproduced is utilised by rectifying the modulated carrier signal and applying the resulting signal in a suitable manner as a control signal to the noise reduction circuit so as to vary the threshold value thereof in accordance with the amplitude of the modulated carrier signal and hence in accordance with the noise level of the modulating signal offered.

In principle the noise reduction circuit described may have either of two embodiments. In a first embodiment the second signal path includes a low-pass filter and the automatic gain control has a characteristic such that offered signals which have an amplitude smaller than its threshold value are greatly attenuated, whereas signals having an amplitude larger than its threshold value are transmitted unattenuated. The output signals of this automatic gain control are added in the summing stage to the signals from the low-pass filter. If the higher-frequency signals offered to the automatic gain control (because of the inclusion of the high-pass filter in the first signal path) have an amplitude larger than the threshold value, the initial signal applied to the noise reduction circuit is obtained again at the output of the summing stage. Obviously, several requirements have to be satisfied. For example, both the gain and the phase shift must be equal for both signal paths. Also the cut-off frequencies of the high-pass filter and of the low-pass filter must be equal, whilst the transition regions of these filters must be as complementary as possible.

A second, preferred embodiment of the noise reduction circuit includes an all-pass filter in the second signal path. In the simplest embodiment this may obviously be a through connection. Thus, the automatic gain control has a characteristic such that offered signals which have amplitudes smaller than the threshold value are transmitted unattenuated, whereas signals having an amplitude larger than this threshold value undergo maximum attenuation. Again, the amplification must be equal for both signal paths, but the phase shift must differ by 180°. As a result, signals at frequencies higher than the cut-off frequency of the high-pass filter included in the first signal path and having amplitudes smaller than the threshold value of the automatic gain control are applied to the summing stage with a phase opposite to the phase of the corresponding signals applied to the summing stage via the all-pass filter, so that these signals will no longer be represented in the output signal of the summing stage.

In general this second embodiment is to be preferred, because obviously the problem of equality of the cut-off frequencies of the high-pass and low-pass filters which arises in the first embodiment now has been avoided. Furthermore, in this second embodiment a particularly advantageous transmission characteristic is obtainable, for in an embodiment of the apparatus according to the invention the all-pass filter is given a transmission characteristic which at least approximately corresponds to the function $(1 - p\tau)/(1 + p\tau)$ and the high-pass filter is given a transmission characteristic which corresponds at least approximately to the function $$(p\tau)^3/\{(p\tau + 1)\ [(p\tau)^2 + p\tau + 1]\}$$

where $p$ is the imaginary angular frequency and $\tau$ is a time constant. The choice of this transmission characteristic provides a highly advantageous overall transmission characteristic, namely a transmission characteristic of a third-order low-pass filter having a "Butterworth" or "maximally level" characteristic in the pass band.

To ensure trouble-free and effective operation of the apparatus according to the invention some further special steps may have to be taken. For example, a carrier signal modulated by a stereophonic low-frequency signal is accompanied by a pilot tone of for example 19 Hz. It is true that this pilot tone has a frequency in the marginal region of the audible range, so that it is not disturbing to the ear, however, when it is applied to the noise reduction circuit the automatic gain control may respond to it and hence exhibit an erroneous amplitude dependent nature. This may be prevented in that the noise reduction circuit is preceded by a low-pass filter the cut-off frequency of which is slightly lower than the frequency of the pilot tone. The foregoing is of particular importance when the noise reduction circuit is used in a stereophonic receiving apparatus. In this use, not only does the pilot tone appear but also there is derived in the receiving apparatus from this pilot tone an auxiliary signal at twice the frequency which is likely to influence the behaviour of the automatic gain control. Hence it is essential that each of the two noise reduction circuits included in the two stereophonic channels should be preceded by a low-pass filter.

A second provision may be the inclusion of an additional amplifier in the first signal path of the noise reduction circuit. To obtain an effective automatic gain control of simple structure it may be necessary to use a comparatively high threshold value for this automatic gain control. In this case, to enable the noise level to be matched with this threshold value the automatic gain control must be preceded by an amplifier with a gain such that the noise level of the amplified signal corresponds to the threshold value of the automatic gain control. Naturally, the automatic gain control may be succeeded by an additional attenuator to ensure that the gain in the two signal paths of the noise reduction circuit remains equal. The second embodiment of the noise reduction circuit in which an all-pass filter is connected in the second signal path has the additional advantage that the amplifier which precedes the automatic gain control may include a limiter, so that signals having too large amplitudes are prevented from being applied to the automatic gain control. Such large signals may give rise to asymmetric jamming of this automatic gain control and hence to second-harmonic distortion. In the second embodiment the inclusion of this limiter has no adverse effect, because signals having amplitudes larger than the threshold value of the automatic gain control are attenuated in any case, and from this it follows directly that the limiter must be proportioned so as to become operative only for signal levels for which the automatic gain control is considerably driven and which consequently are greatly attenuated by it.

The limiter may advantageously be designed so that its limiting level is adjustable. By using the control signal for the automatic gain control as the control signal for adjusting the limiting level automatic matching of the limiting level to the threshold value of the automatic gain control is obtainable.

Figure 2:
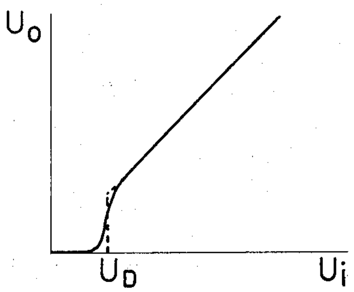
Figure 3A:
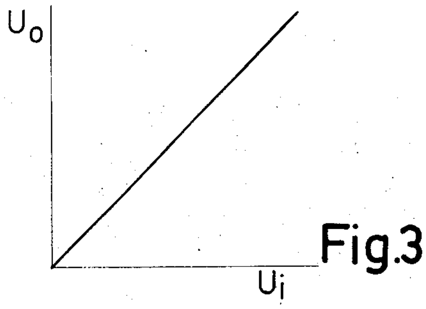
Figure 3B:
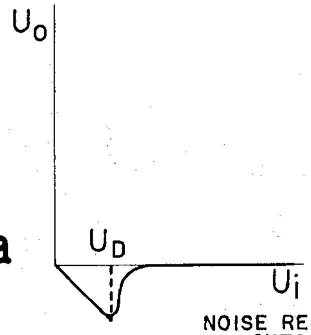
Figure 4:
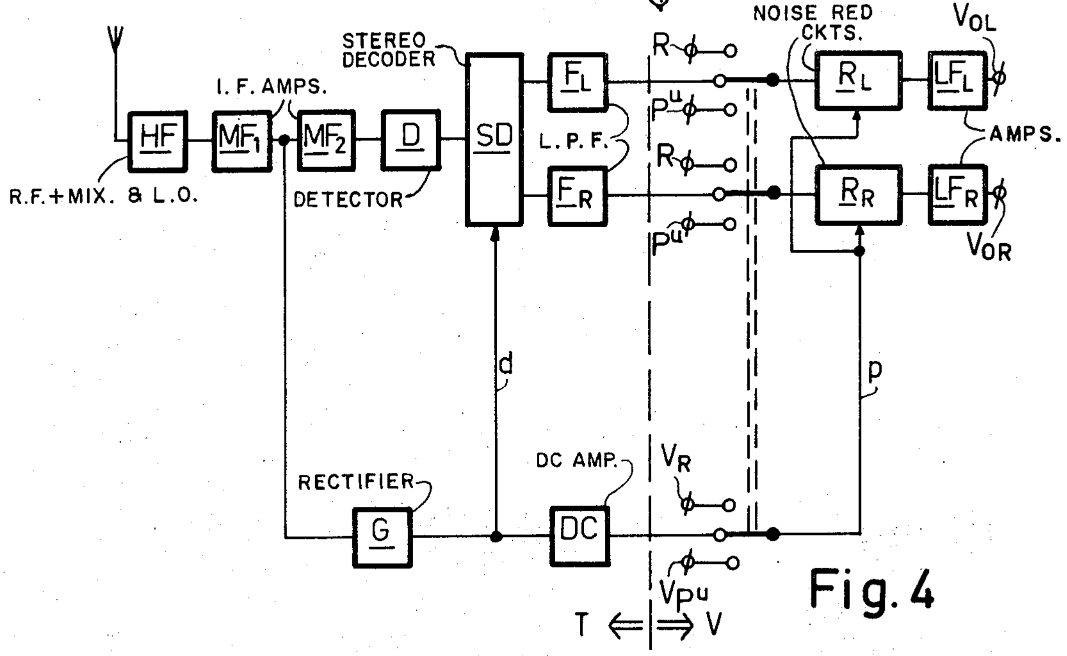
Figure 5:
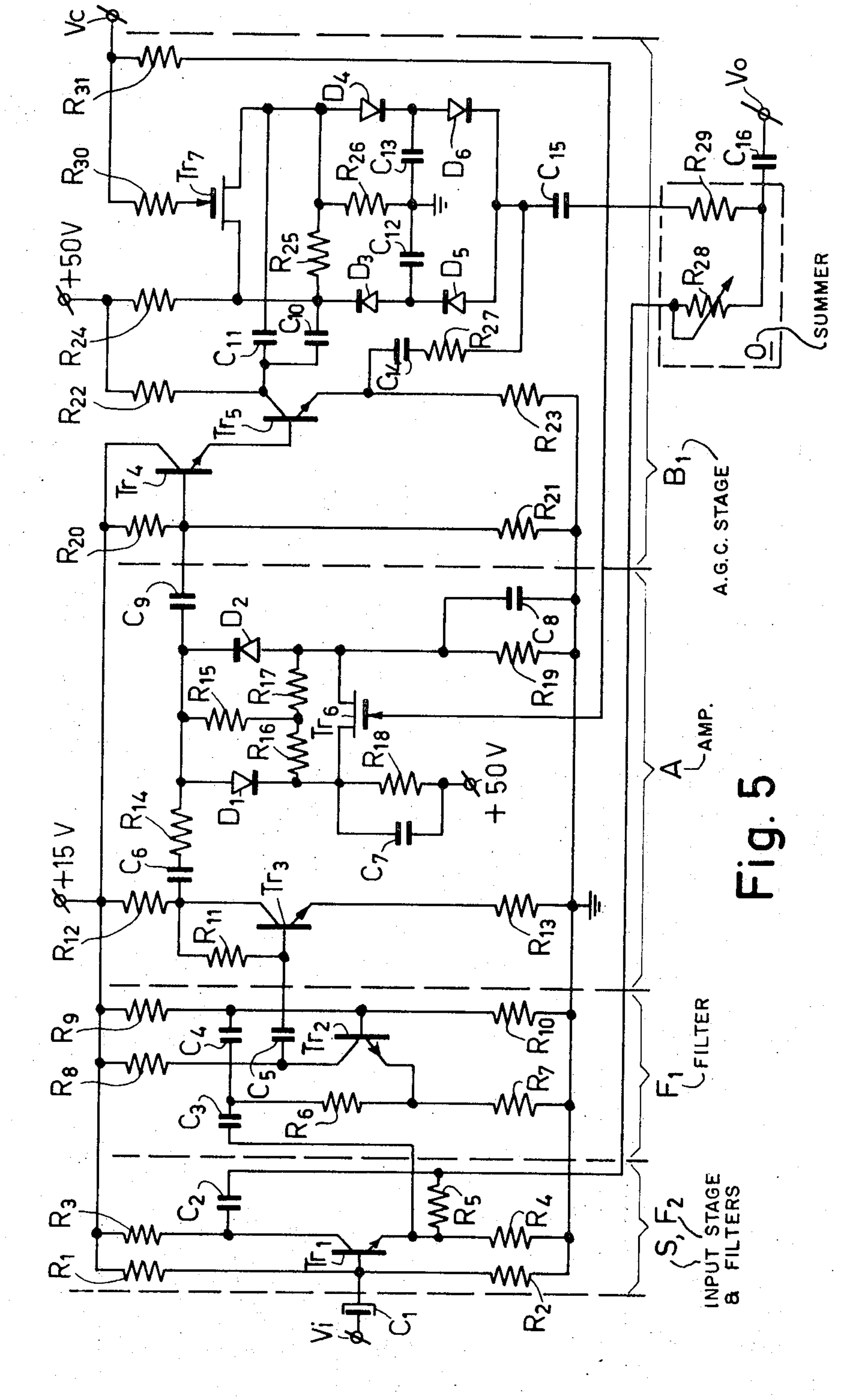
Figure 6:
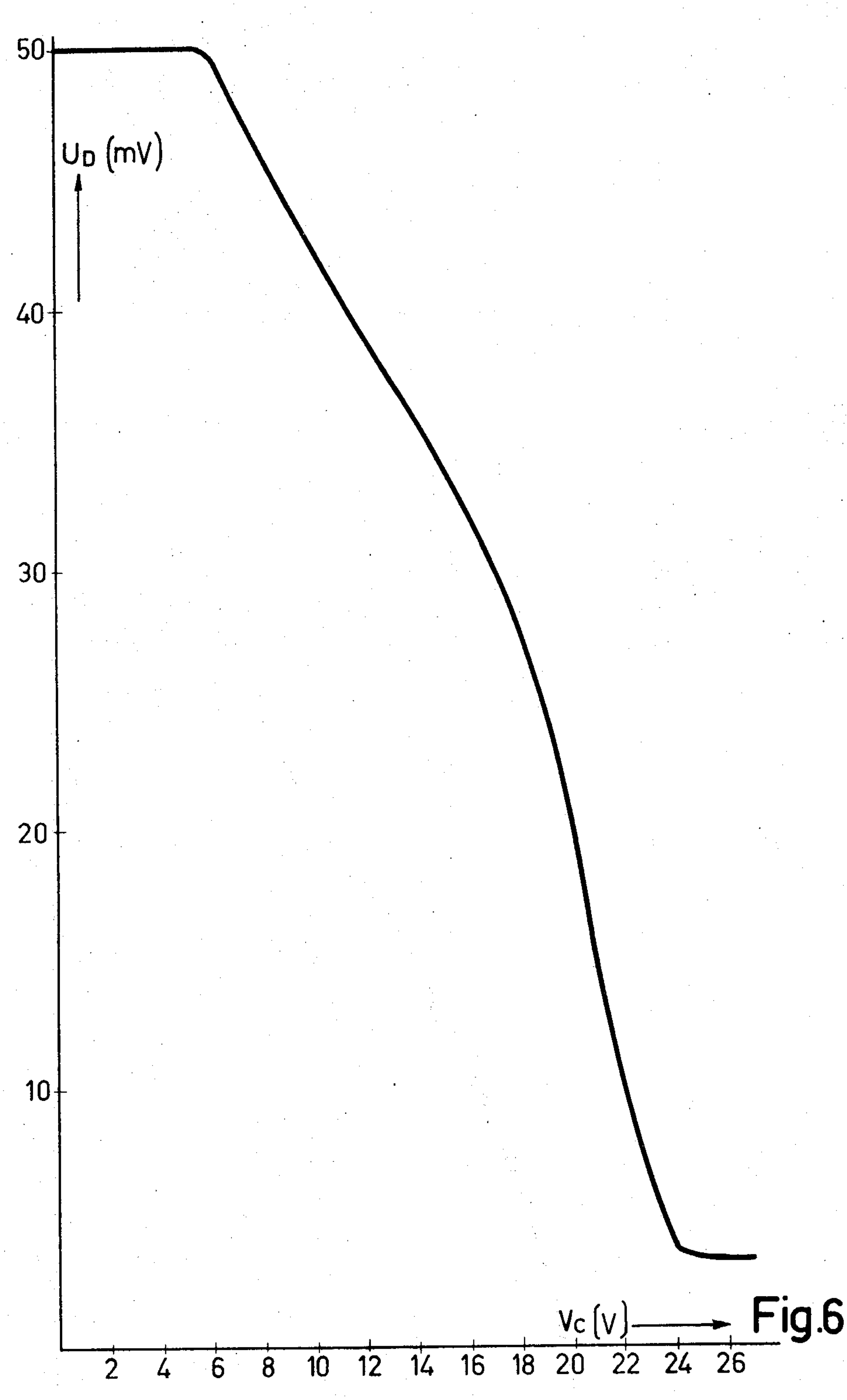

Embodiments of the invention will now be described, by way of example, with reference to the accompanying diagrammatic drawings, in which FIG. 1 is a block-schematic diagram of the structure of a noise reduction circuit used in the apparatus according to the invention, FIGS. 2, 3*a* and 3*b* shows some relevant characteristics of this circuit, FIG. 4 is a block-schematic circuit diagram of an embodiment of a receiving apparatus according to the invention provided with the noise reduction circuit, FIG. 5 shows an embodiment of this noise reduction circuit having an adjustable threshold value and a controllable limiter, and FIG. 6 shows the relationship between the control voltage and the threshold value of the circuit shown in FIG. 5.

FIG. 1 is a block-schematic circuit diagram of the noise reduction circuit used in the receiving apparatus according to the invention. The modulating signal $V_i$ to be processed is applied to an input stage S which has two outputs connected to a first signal path 1 and to a second signal path 2 respectively. After the signals applied to these two signal paths by the input stage have passed through these paths, they are recombined by means of a summing stage O which has two inputs which each are connected to one of the signal paths and one output from which the processed signal $V_o$ may be derived. The first signal path 1 includes a filter $F_1$ and an automatic gain control $B_1$, whilst the second signal path 2 includes a filter $F_2$. As has been described hereinbefore, in principle there are two possibilities to perform the desired noise reduction, and these two possibilities will now be discussed with reference to the characteristics shown in FIGS. 2, 3*a* and 3*b*.

As has been mentioned hereinbefore, in the first embodiment the filter $F_2$ included in the second signal path 2 is a low-pass filter, and the filter $F_1$ included in the first signal path 1 is a high-pass filter. These two filters must have equal cut-off frequencies so that the signal to be processed is divided in two frequency ranges. The automatic gain control $B_1$ must have an amplitude characteristic as shown in FIG. 2, i.e., a characteristic such that signals having amplitudes smaller than the threshold value $U_D$ are greatly attenuated, whereas signals having amplitudes larger than this threshold value are passed unattenuated. Owing to physical limitations, in the region immediately around the threshold value $U_D$ instead of the characteristic shown by a broken line the characteristic shown by a full line is obtained.

The operation of this circuit is as follows. The lower frequencies of the signal to be processed are applied to the summing circuit O via the second signal path 2. The higher frequencies of this signal are applied to the automatic gain control. If this higher-frequency signal has an amplitude greater than the threshold value, it is applied to the summing circuit. In the summing circuit it is added to the lower-frequency signal, so that the output signal $V_o$ corresponds again to the applied signal $V_i$. An obvious condition is that the gains and the phase shifts produced in the two signal paths should be equal. Higher-frequency signals in the first signal path which have amplitudes smaller than the threshold value $U_D$ are greatly attenuated, so that in this case the lower-frequency signal alone is applied to the summing circuit and hence the output signal $V_o$ also comprises this lower-freuqency signal only. Making the threshold value $U_D$ equal to the noise level of the offered signal $V_i$ provides a dynamic noise filter which satisfies the above considerations in respect of frequency dependence and amplitude dependence.

In the second, preferred embodiment the filter $F_1$ included in the first signal path again is a high-pass filter, but the filter $F_2$ included in the second signal path is an all-pass filter. The automatic gain control in the first signal path has an amplitude characteristic as shown in FIG. 3*b*, i.e., signals having amplitudes smaller than the threshold value are passed unattenuated, whereas signals having amplitudes greater than this threshold value are greatly attenuated. In this embodiment also, owing to the physical limitations there will be no abrupt transition (broken line) but a gradual transition (full line). Although the gains which occur in the two signal paths must be equal, in contradistinction to the first embodiment the phase shifts of the signals must differ by 180°.

For higher-frequency signals, that is for signals having frequencies higher than the cut-off frequency of the high-pass filter $F_1$, an amplitude-dependent behaviour of the noise reduction circuit as illustrated in FIG. 2 is obtained in the second embodiment also, the second signal path has an amplitude-independent behaviour for all frequencies (FIG. 3*a*), whilst the first signal path has the amplitude-dependent nature illustrated in FIG. 3*b*. However, because the phase shifts differ by 180°, in the first signal path a higher-frequency signal having an amplitude smaller than the threshold value $U_D$ is applied to the summing circuit with a phase opposite to that of the corresponding signal from the all-pass filter, so that these signals cancel one another and hence for these higher-frequency signals an amplitude characteristic is obtained which corresponds to that shown in FIG. 2.

A first advantage of this second embodiment over the first embodiment is that the frequency behaviour of the circuit is determined only by the high-pass filter. In the first embodiment this frequency behaviour may give rise to difficulty, because when the offered signal is divided in two frequency ranges care must be taken to ensure that the cut-off frequencies of the high-pass filter and of the low-pass filter coincide and the transition regions of the two filters are complementary, which requirements are not readily satisfied. Further, the second embodiment enables a very advantageous overall transmission characteristic to be obtained by a special choice of the filters, for if in a preferred embodiment of the invention the all-pass filter $F_2$ is chosen to have a transmission characteristic which corresponds to the function $(1 - p\tau)/(1 + p\tau)$ and the high-pass filter to have a transmission characteristic $$[p(\tau)^3]/\{(p\tau + 1)\ [(p\tau)^2 + p\tau + 1]\}$$

an overall transmission characteristic is obtained which corresponds to the function $$1/\{(1 + p\tau)\ [1 + p\tau + (p\tau)^2]\}$$

This is exactly the transmission function of a third-order low-pass filter having a "Butterworth" or "maximally level" characteristic in the passband.

The second embodiment has another advantage in respect of the design of the automatic gain control $B_1$. To permit the use of a simple design of this automatic gain control it may be desirable to employ a given threshold value which is several times larger than the noise level in the offered signal $V_i$. To match these two levels the automatic gain control $B_1$ must in this case be preceded by an additional amplifier A (FIG. 1) which raises the noise level to a value which corresponds to the threshold value of the automatic gain control. However, higher-frequency signals having a level appreciably higher than this noise level are also amplified, so that the automatic gain control may be required to handle signals having very large amplitudes, which may readily give rise to distortion phenomena. However, in the second embodiment there is no objection to the inclusion in the amplifier A of a limiter which limits the amplitude of the signal applied to the automatic gain control $B_1$, for in this second embodiment the operation of the automatic gain control is such that signals having amplitudes greater than the threshold value are strongly attenuated. Consequently the distortion of such signals which is caused by the limiter does not effect the output signal $V_o$. In the first embodiment, however, such signals must be passed without any attenuation, so that the automatic gain control is required to be capable of handling large-amplitude signals without giving rise to distortion and hence the inclusion of a limiter in the amplifier A is obviously now allowed.

It will be clear that the automatic gain control must be succeeded by an additional attenuator $B_2$ to cancel the addition gain introduced into the first signal path by the amplifier A. Naturally, equality of the gains produced in the two signal paths may be achieved by appropriately choosing the amplification factors of the elements included in these paths and by suitably choosing the transmission ratios which occur in the input stage and the summing stage.

FIG. 4 shows an embodiment of a receiving apparatus according to the invention, namely a receiving apparatus suitable for the reception of stereophonic signals. The receiving apparatus in known manner comprises a tuning device T by means of which the modulating signals to be reproduced are obtained from the received modulated carrier, and a low-frequency amplifier V by means of which these low-frequency signals are raised to a level suitable for reproduction. The tuning device T in known manner comprises a high-frequency pre-selecting stage, a mixer stage including a local oscillator, which stages together are indicated by HF, several intermediate-frequency stages $MF_1$, $MF_2$, a detector D and a stereo decoder SD at the outputs of which the two stereo signals appear.

The low-frequency amplifier V in this case obviously comprises two separate amplifiers $LF_1$ and $LF_2$, one for each stereo channel, and these amplifiers in the usual manner each comprise several stages. The low-frequency amplifier further comprises various tone controls and filters, for example scratch and rumble filters.

As the Figure shows, each stereo channel includes a noise reduction circuit ($R_L$ and $R_R$ respectively) to which the modulating signals from the stereo decoder are applied. As has been described hereinbefore, to each of these noise reduction circuits $R_L$ and $R_R$ a control signal is to be applied for matching the threshold value to the noise level present in the modulating signal offered. This control signal is applied to the noise reduction circuits via a lead P. As has been stated hereinbefore, a suitable control signal is obtainable by rectifying the modulated carrier signal. In the case of a receiving apparatus for frequency-modulated signals the signal to be rectified is preferably derived from a suitably chosen point in the intermediate-frequency amplifier. In such a receiving apparatus, with increasing input-signal amplitude the intermediate-frequency stages are successively subjected to limitation, so that the last intermediate-frequency stage does no more contain any information about the amplitude of the input signal. The desired signal may, for example, be derived from the output of one of the preceding intermediate-frequency stages, and this is schematically indicated in the Figure, in which the signal is derived from the output of the intermediate-frequency stage $MF_1$. This signal is rectified by means of a rectifier G and, as the case may be, amplified by means of a direct-current amplifier DC and then is applied via the lead P as a control signal to the noise reduction circuits $R_L$ and $R_R$. Obviously the amplifier DC is chosen to have a characteristic such as to provide a control signal which when applied to the automatic gain control of each noise reduction circuit gives proper matching of the threshold value of this automatic gain control to the noise level.

An advantageous circumstance in the production of the desired control signal is that in many receiving apparatus a suitable direct voltage is available in any case. This direct voltage is used, for example, for tuning indication and, in stereo receivers, to effect an automatic change-over from stereo reception to mono reception and vice versa in accordance with the amplitude of the received modulated carrier signal, for it has been found that noise having a given level exerts a considerably more annoying effect on the stereo signals being reproduced then on a monaural signal derived from these stereo signals. Hence at a given low level of the received modulated carrier, i.e., at a given noise level, it is desirable for the receiver to change over automatically to monaural reproduction, because a reasonably good monaural reproduction is to be preferred over a poor stereophonic reproduction. This change-over is effected by means of the rectified carrier signal applied to the stereo decoder via a lead *d*, and this rectified signal may also be used to control the noise reduction circuits.

The apparatus according to the invention has the considerable advantage that the level at which the change-over from stereo reception to mono reception is to be effected may be chosen to be considerably lower, because owing to the controlled noise reduction circuits the noise contained in the stereophonic signal to be reproduced is efficaciously reduced.

Adequate reduction of the noise further requires two low-pass filters $F_L$ and $F_R$ which are connected between the stereo decoder SD and the noise reduction circuits $R_L$ and $R_R$, for the received frequency-modulated carrier signal contains a pilot tone at a frequency of, for example, 19 kHz, which is also used to produce a subcarrier at twice the frequency for use in stereo decoding. It will be clear that the noise reduction circuits must not respond to the amplitudes of this pilot and this subcarrier, and this is the more urgent as the amplitudes of the pilot tone and the subcarrier often are greater than the noise level, which would prevent any noise reduction. The inclusion of the low-pass filters $F_L$ and $F_R$, which consequently must have cut-off frequencies which are slightly lower than the pilot-tone frequency and preferably produce an attenuation of more than 18 dB per octave, eliminates the influence of these tones on the behaviour of the noise reduction circuits.

It will be appreciated that the noise reduction circuits provided in the receiving apparatus may be used not only when received modulated carrier signals are reproduced, but also when signals which have been recorded on a magnetic tape or in a disc record are reproduced via the low-frequency amplifier of the receiving apparatus. For this purpose the noise reduction circuits are preceded by two ganged switches which enable the inputs of the noise reduction circuits to be connected to terminals R or PU to which signals from a tape recorder and a record player respectively may be applied. It will be clear that the control signal for the noise reduction circuit must then also be adapted. Because the noise level in such signals to be reproduced is comparatively constant, in general a constant control signal will be sufficient. Hence, the lead P includes a switch which is ganged with the said switches and via which in the case of the reproduction of magnetically recorded signals a constant voltage $V_R$, and in the case of the reproduction of disk records a constant voltage $V_{PU}$, is applied to the lead.

Although so far a receiving apparatus has been discussed which comprises both the tuning device (tuner) and the low-frequency amplifier (amplifier unit), the invention may obviously be used also when the tuner and the amplifier are separate units, as is indicated in the Figure by T and V. In this case the noise reduction circuits will appropriately be accommodated in the amplifier, enabling them to process, in addition to the modulated carrier signal, signals from tape recorders and record players. The low-pass filters $F_L$ and $L_R$ may be accommodated either in the tuner or in the amplifier. The tuner and the amplifier must be connected by an additional signal lead through which the control signal for the noise suppression circuits which is produced in the tuner is applied to the amplifier.

FIG. 5 shows, by way of example, a noise reduction circuit which has an adjustable threshold value and a controllable amplifier and may be used in the receiving apparatus according to the invention, the parts enclosed between the broken lines corresponding to the similarly designated blocks in FIG. 1.

The input stage S and the all-pass filter $F_2$ have been combined and are realized by means of a transistor circuit which comprises a transistor $Tr_1$ having equal emitter and collector resistors $R_4$ and $R_3$ respectively and the series combination of a capacitor $C_2$ and a resistor $R_5$, which series combination is connected in parallel with the collector emitter path of the transistor $Tr_1$. This structure of the transistor circuit provides an all-pass filter the output signal of which may be derived from the junction point of the capacitor $C_2$ and the resistor $R_5$, and which filter has the aforementioned favourable transmission characteristic which corresponds to the function $(1 - p\tau)/(1 + p\tau)$. The signal $V_i$ to be processed is applied via a capacitor $C_1$ to the base of the transistor $Tr_1$ which is biassed by means of resistors $R_1$ and $R_2$.

The signal for the first signal path is derived from the emitter of the transistor $Tr_1$ and applied to the high-pass filter $F_1$. This high-pass filter has a transmission characteristic which at least approximately corresponds to the aforementioned function $$(p\tau)^3/\{(p\tau + 1)\ [(p\tau)^2 + p\tau + 1]\}$$

The realisation of this transmission function is based on the filter synthesis:

$$(p\tau)^3/\{(p\tau + 1)\ [(p\tau)^2 + p\tau + 1]\} = p\tau/(p\tau + 1) \cdot p\tau/(p\tau + 1) \cdot p\tau/[p\tau + 1 - (p\tau/p\tau + 1)\ ]$$

This transmission function is realized by means of an active filter. This filter comprises an RC high-pass filter (capacitor $C_4$ and resistors $R_9$, $R_{10}$) which is followed by a feed-back path comprising a voltage amplifier which has about unity amplification and in this embodiment takes the form of a transistor $Tr_2$. The active filter further comprises a capacitor $C_3$ at its input and a second RC high-pass filter at its output which comprises a capacitor $C_5$ and the input resistance of an amplifier A which succeeds the high-pass filter $F_1$, in this case the input resistance of a transistor $Tr_3$ provided with negative feedback. The capacitor $C_5$ may also be connected to the emitter of the transistor $Tr_2$ instead of to its collector.

The amplifier A includes an amplifier stage in the form of the transistor $Tr_3$. This amplifier A is required to raise the signal, and in particular the level of the noise present in this signal, to a value suitable for the automatic gain control $B_1$ which succeeds the amplifier. This automatic gain control $B_1$ comprises the series combination of two diodes $D_3$ and $D_5$ and the series combination of two diodes $D_4$ and $D_6$, but it will be clear that the diodes may be replaced by transistors connected as diodes. The junction point between the diodes $D_3$ and $D_5$ is connected to earth potential through a capacitor $C_{12}$, and the junction point of the diodes $D_4$ and $D_6$ is connected to earth potential via a capacitor $C_{13}$. The anode of the diode $D_5$ is connected to the cathode of the diode $D_6$, and from this junction point the output signal of the automatic gain control is derived, whilst the cathode of the diode $D_3$ is connected to the anode of the diode $D_4$ via a resistor $R_{25}$. The output signal of the amplifier A is applied to an amplifier stage comprising transistors $Tr_4$ and $Tr_5$. The signal taken from the collector of the transistor $Tr_5$ is applied to the cathode of the diode $D_3$ and to the anode of the diode $D_4$ through capacitors $C_{10}$ and $C_{11}$ respectively, and the emitter of this transistor $Tr_5$ is connected, via a capacitor $C_{14}$ and a resistor $R_{27}$, to the junction point of the diodes $D_5$ and $D_6$.

The operation of this automatic gain control is based on the resistance variations of diodes in accordance with the value of the current. As is known, this resistance is very high for small voltage values and rapidly decreases when the voltage across the diode exceeds a certain value.

The diodes $D_5$ and $D_6$ are used as variable resistors, whilst the diodes $D_3$ and $D_4$ together with the capacitors $C_{12}$ and $C_{13}$ fix the bias for these diodes $D_5$ and $D_6$ as a function of the amplitude of the signal applied via the amplifier A. The diodes $D_3$ and $D_4$ together with the capacitors $C_{12}$ and $C_{13}$ form rectifiers for the signal derived from the collector of the transistor $Tr_5$, the capacitors $C_{12}$ and $C_{13}$ being charged to a voltage which depends upon the amplitude of this signal. Because the voltage across these capacitors fix the bias for the diodes $D_5$ and $D_6$, this results in that the threshold value, i.e., the amplitude of the signal from the emitter of the transistor $Tr_5$ at which the diodes become conductive, also is fixed as a function of the amplitude of this signal.

Consequently the higher-frequency signal at the emitter of the transistor $Tr_5$ undergoes voltage division between the resistor $R_{27}$ and the diodes $D_5$ and D6 in accordance with the amplitude of the signal at the collector of the transistor $Tr_5$, which signal obviously corresponds to this higher-frequency signal. Hence, for a higher-frequency signal which has an amplitude smaller than the threshold value of the diodes there is produced at the output of the automatic gain control, i.e., the junction point of the diodes $D_5$ and $D_6$, an output signal which corresponds to this higher-frequency signal, because in this case the diodes have a high resistance. For a higher-frequency signal which has an amplitude greater than the said threshold value a greatly attenuated output signal is produced, because in this event the resistance of the diodes $D_5$ and $D_6$ has greatly decreased.

Since the threshold value of the automatic gain control must be controllable in accordance with a control signal obtained from the tuner, further provisions must be made to achieve this behaviour of the automatic gain control. In the embodiment shown this may be achieved in a very simple manner. The cathode of the diode $D_3$ is connected via a resistor $R_{24}$ to a point of constant potential (for example +50 volts) and the anode of the diode $D_4$ is connected to earth potential via a resistor $R_{26}$. Via the resistors $R_{24}$, $R_{25}$ and $R_{26}$ a direct current will flow from the point of positive potential (+ 50 volts) to earth, so that across the resistor $R_{25}$ a direct voltage is produced which influences the conductive periods of the diodes $D_3$ and $D_4$ and hence the direct-current bias of the diodes $D_5$ and $D_6$, which in turn influences the threshold value of the automatic gain control. To enable the threshold value to be controlled by means of a control signal the resistor $R_{25}$ is shunted by the main current path of a transistor $Tr_7$, which in the embodiment shown is of the field-effect type, but which may also be a bipolar transistor. Via a resistor $R_{30}$ a control signal $V_c$ is applied to the gate of this transistor $Tr_7$, so that the resistance of the current path of the resistor varies in accordance with this control signal. As a result, the resistance of the parallel combination of this transistor and the resistor $R_{25}$ also varies, so that the direct voltage across this resistor $R_{25}$ and hence the threshold voltage of the automatic gain control will vary in accordance with the control signal $V_c$.

As has been mentioned hereinbefore, the amplifier A is required to match the noise level in the signal with the threshold voltage of the automatic gain control. Silicium diodes, for example, have threshold values between 300 mV and 500 mV, whilst the noise to be reduced normally is of the order of a few tens of millivolts. Hence considerable amplification is required to match the noise level of the signal offered to the automatic gain control with its threshold value. However, large-amplitude signals are amplified by the same factor, with the consequent likelihood that the automatic gain control is asymmetrically jammed so that second-harmonic distortion may occur, which distortion normally is avoided by the structure of the automatic gain control. If now, for example, the cut-off frequency of the high-pass filter $F_1$ is made 5 kHz, the said second-harmonic distortion lies within the audible range and hence is undesirable.

To avoid the occurrence of this second-harmonic distortion the amplifier A includes a limiter circuit. This circuit comprises two diodes $D_1$ and $D_2$, the cathode of the diode $D_1$ being connected to the anode of the diode $D_2$ via the series combination of two resistors $R_{16}$ and $R_{17}$, whilst the signal amplified by the transistor $Tr_3$ is applied to the anode of the diode $D_1$ and the cathode of the diode $D_2$ and also to one end of a resistor $R_{15}$ the other end of which is connected to the junction point of the resistors $R_{16}$ and $R_{17}$. The cathode of the diode $D_1$ is also connected to a point of constant potential (+50 Volts) via a resistor $R_{18}$ which is shunted by a decoupling capacitor $C_7$. The anode of the diode $D_2$ is also connected to earth potential via a resistor $R_{19}$ which is shunted by a decoupling capacitor $C_8$. Owing to the direct-current path via the resistors $R_{18}$, $R_{16}$, $R_{17}$ and $R_{19}$, there is set up across the resistors $R_{16}$ and $R_{17}$ a direct voltage which fixes the limiting level of the circuit. This limiting level is controlled, in the same manner as is the threshold value of the automatic gain control, by the control signal $V_c$ which via a resistor $R_{31}$ is applied to the gate of a field-effect transistor $Tr_6$ the main current path of which shunts the series combination of the resistors $R_{16}$ and $R_{17}$.

The summing stage 0 has a very simple structure and comprise a resistor $R_{28}$, to which the output signal of the all-pass filter $F_2$ is applied, and a resistor $R_{29}$, to which via a decoupling capacitor $C_{15}$ the output signal of the automatic gain control is applied. Obviously, one of these resistors may be variable to permit fine adjustment to achieve amplitude equality of the corresponding signals applied via the two signal paths. The free ends of the resistors $R_{28}$ and $R_{29}$ are connected to one another, their junction point being connected via a decoupling capacitor $C_{16}$ to an output terminal from which the output signal $V_o$ of the noise reduction circuit may be derived.

FIG. 6 shows the relationship between the control voltage $V_c$ and the threshold value $U_D$ which is produced for the offered signal and has been measured in the circuit shown in FIG. 5. The characteristic shows that there is an approximately linear relationship between the control voltage and the threshold value. Since the relationship between the amplitude of the modulated carrier signal and the noise level is similar, the use of a control signal obtained by rectification of the modulated carrier signal provides correct control of the threshold value, whilst obviously optimum adjustment is obtainable by selecting an appropriate transmission characteristic of the direct-current amplifier DC.

It should be noted that the invention may also be used in receivers for amplitude-modulated carrier signals. In such use the control direct voltage may be derived from the automatic gain control voltage produced by the AM detector.

What is claimed is:

1. An apparatus comprising an input stage having a input means for receiving an analogue signal of a selected bandwidth having a noise component and first and second outputs; noise reduction means for attenuating signals having a frequency higher than a given cut-off frequency within said selected bandwidth and an amplitude smaller than a selected threshold value, said reduction means comprising an output summing stage having first and second inputs and an output means for supplying said signal with a reduced noise component; a first signal path comprising a high pass filter coupled to said first output and having said given cut-off frequency, and automatic gain control stage coupled between said filter and said first input and having a threshold level and a threshold control input means for receiving a control signal in accordance with the amplitude of said noise component; and a second signal path coupled between said second output and said second input.

2. Apparatus as claimed in claim 1 wherein said second signal path includes an all-pass filter, and wherein the gain of the automatic gain control stage decreases when the signal applied thereto exceeds the threshold level, the amplitudes of the signals applied to the summing stage are at least approximately equal and their phases are opposite to one another.

3. Apparatus as claimed in claim 2, wherein said all-pass filter has a transmission function which at least approximately corresponds to the function $(1 - p\tau)/(1 + p\tau)$, and the high-pass filter has a transmission function which at least approximately corresponds to the function $$(p\tau)^3/\{(p\tau + 1)\ [(p\tau)^2 + p\tau + 1]\}$$

where $p$ is the imaginary angular frequency and $\tau$ is a time constant.

4. Apparatus as claimed in claim 2, wherein said automatic gain control stage includes a first diode and a second diode and a first input terminal which is connected to the anode of the first diode and to the cathode of the second diode, and means for applying to the cathode of the first diode and to the anode of the second diode a direct voltage which depends upon the amplitude of the signal applied to the first input terminal and upon the value of the control signal applied to the automatic gain control stage.

5. Apparatus as claimed in claim 4, wherein said automatic gain control stage further includes a third diode the anode of which is connected to the cathode of the first diode, a fourth diode the cathode of which is connected to the anode of the second diode, a first resistor connected between the cathode of the third diode and the anode of the fourth diode, a first constant potential point, a first capacitor connected between the cathode of the first diode and said point of constant potential, a second capacitor connected between the anode of the second diode and the second point of constant potential, a second point of constant potential, a second resistor connected between the anode of the fourth diode and said second point of constant potential, a third point of constant potential higher than said first and second points a third resistor connected between the cathode of the third diode and said third constant potential point, a second input terminal, two capacitors connected to said second input terminal and to the ends of the first resistor, means for applying a signal which is proportional to the signal at the first input terminal to said second input, and a semiconductor element having a main current path shunting the first resistor and a control electrode means for receiving the control signal.

6. Apparatus as claimed in claim 2 wherein the first signal path between the high-pass filter and the automatic gain control stage comprises an amplifier having a limiter circuit means for preventing the signal applied to the automatic gain control stage from exceeding a given maximum limiting level.

7. Apparatus as claimed in claim 6, wherein the limiter circuit has a control input means for receiving a control signal having an amplitude in accordance with said noise component to adjust the limiting level.

8. Apparatus as claimed in claim 7, wherein said limiting circuit comprises a fifth diode and a sixth diode, a common input and output terminal connected to the anode of the fifth diode and to the cathode of the sixth diode, a series combination of a fourth resistor and a fifth resistor connected between the cathode of the fifth diode and the anode of the sixth diode, a sixth resistor connected between the input terminal and the junction point of the fourth and fifth resistors, a first constant positive potential point, a seventh resistor connected between the cathode of the fifth diode and said point of constant positive potential, a second constant potential point, an eighth resistor connected between the anode of the sixth diode and said second point of constant potential, and a semiconductor element having a main current path shunting the series combination of the fourth and fifth resistors and a control electrode means for receiving the control signal.

9. Apparatus as claimed in claim 1, wherein said analogue signal comprises a demodulated signal and a pilot tone of a given frequency, said apparatus further comprising a low-pass filter coupled to said input stage input means having a cut-off frequency which is lower than the frequency of a pilot tone.

10. Apparatus as claimed in claim 1 further comprising a first switch coupled to said input means and having first and second position contacts, a tuning device coupled to said first position contact, a recorded source coupled to said second position contact, a second switch coupled to said noise reduction circuit ganged with the first switch and having first and second position contacts, means coupled to said second switch first position contact for rectifying a modulated carrier signal from said tuner and for producing an applying a control signal to the noise reduction circuit and means coupled to second switch second contact for producing a constant control signal.

11. An apparatus as claimed in claim 1 wherein said analogue signal comprises a demodulated signal, and further comprising means for rectifying the modulted carrier signal to produce said control signal.

* * * * *